UNITED STATES PATENT OFFICE.

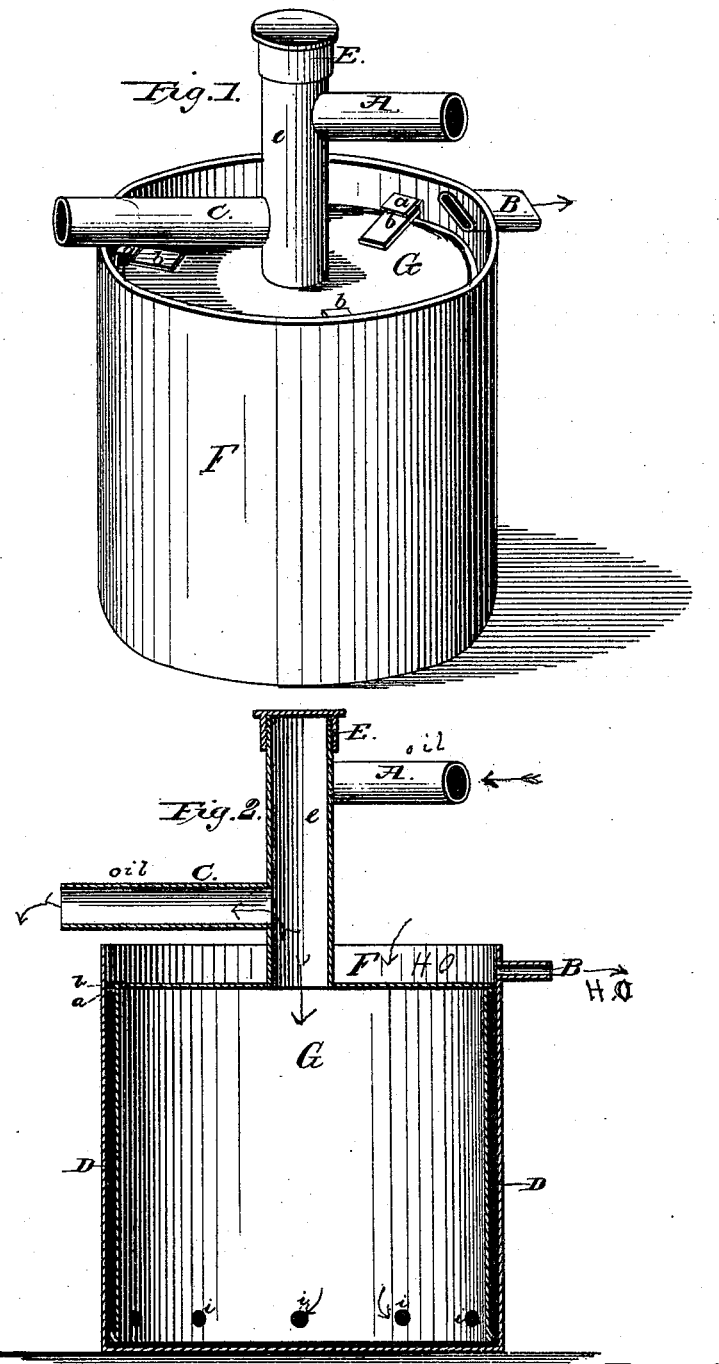

STEPHEN WEBSTER, OF ST. CATHARINES, CANADA.

IMPROVEMENT IN OIL-TANKS.

Specification forming part of Letters Patent No. 179,238, dated June 27, 1876; application filed January 3, 1876.

*To all whom it may concern:*

Be it known that I, STEPHEN WEBSTER, of St. Catharines, in the county of Lincoln and Province of Ontario, Canada, have invented certain new and useful Improvements in Oil-Tanks; and I do hereby declare that the following is a full, clear, and exact description thereof, which will enable others skilled in the art to which it appertains to make and use the same, reference being had to the accompanying drawings, which form a part of this specification, and in which—

Figure 1 is a perspective view, and Fig. 2 is a vertical section.

Similar letters of reference indicate corresponding parts in both the figures.

This invention relates to that class of tanks or reservoirs for holding or storing naphtha, petroleum, and other volatile fluids, that consists of an inner vessel inserted within an outer reservoir, filled or partially filled with water; and its object is to so construct the respective tanks that they may be readily attached to or detached from each other by simply partially rotating the inner vessel within the outer reservoir, substantially as hereinafter more fully explained, and pointed out in the claim.

In the drawing, F is a tank, made preferably of sheet metal, of cylindrical shape, and having, near its top, an outlet or overflow pipe, B. Upon the inside of this tank, just below pipe B, is a series of two or more projecting lugs, $a$, under which a corresponding series of lugs, $b$, that are securely affixed upon and project from the top of the oil-reservoir G, may be slid, so as to keep this latter in place. The inside cylindrical tank G, which is bottomless, has, near its lower end, a series of perforations, $i$, for the object hereinafter stated. A pipe, $e$, having cap or cover E, projects from the top of tank G, and the filling-pipe and drawing-off pipes A C branch off from the same, as shown.

The manner of using my improved oil-tank is as follows: Tank F being filled or partly filled with water the tank G is inserted into the same. The oil is then conducted into it through the filling-pipe A. When the space between the water-line and the top of the tank G is filled with the oil this ascends into tube $e$, until it reaches the top or cap E. The pressure thus exerted forces the water out through perforations $i$, in the bottom of tank G, and into the space D, between the tanks G and F, from which it is discharged through overflow-pipe B.

The filling operation is continued until the tank is filled within a few inches of the bottom, which may be easily ascertained by the bubbles of oil arising to the surface of space D. The overflow-pipe B being above the top of tank G, (this latter being kept in place by means of projections $a$ $b$,) the oil-tank is constantly immersed in water, and there can be no possible danger of loss from leakage or evaporation.

By the arrangement of the lugs $b$, projecting from the top of the inside tank G, in combination with the lugs $a$, projecting interiorly from the walls of the outer tank F, a means is provided by which the respective tanks may be readily attached to or detached from each other, whenever it is desired to clean the inner tank G, or replenish the outer tank F with water.

I am aware that it is not new to construct an oil tank or reservoir consisting of two tanks, one inserted within the other, and having suitable supply and discharge pipes, and devices for securing the two tanks together in their respective positions; hence I do not claim such construction, broadly; but

What I claim, and desire to secure by Letters Patent of the United States, is as follows:

The combination of the outer cylindrical tank F, having lugs $a$, projecting at right angles from its inner wall, with the inside cylindrical and bottomless tank G, having a series of perforations, $i$, near its lower edge, and lugs $b$, projecting at right angles from its roof or cover, substantially as and for the purpose herein shown and described.

In witness whereof I have hereunto signed my name in presence of two subscribing witnesses this 30th day of November, A. D. 1875.

STEPHEN WEBSTER.

Witnesses:
FRANKLIN J. BROWN,
ALBERT W. KINSMAN.